United States Patent [19]
Gehman

[11] 3,761,908
[45] Sept. 25, 1973

[54] OBJECT DETECTION SYSTEM

[75] Inventor: John B. Gehman, La Jolla, Calif.

[73] Assignee: General Dynamics Corporation, San Diego, Calif.

[22] Filed: Dec. 20, 1971

[21] Appl. No.: 209,982

[52] U.S. Cl. ............................340/258 R, 343/17.5
[51] Int. Cl. ............................................. G08b 13/24
[58] Field of Search ................... 340/258 R, 258 A, 340/258 B, 258 C; 343/17.5, 8

[56] References Cited
UNITED STATES PATENTS

| | | | |
|---|---|---|---|
| 3,168,735 | 2/1965 | Cartwright | 343/17.5 X |
| 3,173,138 | 3/1965 | Erst | 343/17.5 X |
| 3,128,416 | 4/1964 | Rode | 340/258 C X |
| 3,214,756 | 10/1965 | Goldberg | 343/17.5 X |
| 3,230,518 | 1/1966 | Vassil et al. | 340/258 C |
| 3,237,191 | 2/1966 | Bojko | 340/258 C |
| 3,550,106 | 12/1970 | Gehman | 340/258 R |
| 3,576,565 | 4/1971 | Schulz | 340/258 C X |

Primary Examiner—David L. Trafton
Attorney—Martin Lukacher

[57] ABSTRACT

An intrusion detection system is described wherein an antenna establishes a sensing field in the area to be secured. The field having at least two different principal frequencies in the VHF band. These frequencies are generated by heterodyning (double sideband modulation) or by frequency modulation. The cyclic variations in the frequency (frequency shift) or the amplitude variations in the generated signals due to an intruder perturbing the sensing field and are detected by monitoring each frequency and determining the frequency differential or amplitude differential therebetween. The frequency or amplitude differential signal is processed to indicate the presence of an intruder, as by producing an alarm output.

6 Claims, 4 Drawing Figures

OBJECT DETECTION SYSTEM

The present invention relates to electromagnetic intrusion detection systems and particularly to systems for detecting the presence of an object or other target by the perturbations caused by the object or target as it enters and moves through the field.

The invention is especially suitable for use in intrusion detection systems for protecting or securing an area without being obtrusive so as to be noticed by the intruder.

Reference is made to U.S. Pat. No. 3,550,106 issued Dec. 22, 1970 in the name of John B. Gehman. This patent describes an electromagnetic object detection system where a sensing field is established in an area to be secured by an unobtrusive antenna. The antenna is excited by dual oscillators so as to establish a field having two frequencies. Shifts in the frequency differential of the generated signals are utilized to provide output signals which are processed to detect the intruding object. The generation of the field having both frequencies and at the same time detecting both frequencies to produce an output corresponding to the shift in frequency of the frequency differential therebetween presents certain problems.

In accordance with this invention the dual frequency field is generated by amplitude modulation or frequency modulation techniques, thereby affording simplification in coupling of the dual frequency signal to the antenna which establishes the field and in detecting the signals so as to provide outputs corresponding to the perturbations in the field produced by an intruding object. Other features of the system described in the above referenced patent are retained, such as enhanced sensitivity over the entire sensing field which may extend from the antenna a considerable distance, say 100 feet or more depending upon environmental conditions, such as density of foliage and conductivity of the soil, in the event that the system is used out of doors. Other features of the present invention include increased sensitivity detectors and simplification of circuitry afforded through the use of fewer parts thereby providing increased reliability.

It is an object of the present invention to provide an improved electromagnetic object detection system.

It is another object of the present invention to provide an improved electromagnetic object detection system utilizing a sensing field having two discrete frequencies.

It is a further object of the present invention to provide an improved object detection system wherein both the generation and detection of dual frequency signals is simplified and may be accomplished with greater sensitivity and reliability than heretofore.

Briefly described, an intrusion detection system embodying the invention utilizes an antenna for establishing a sensing field. The antenna is excited by modulating a carrier signal with a modulating signal to produce signals having first and a like different frequencies at least at alternate successive intervals of time. Modulation may be by amplitude or frequency modulation techniques, in either case the field has two discrete frequencies. In the event that amplitude modulation is utilized, a balanced modulator is desirably provided so as to produce double sideband signals while suppressing the carrier. When frequency modulation is utilized the modulation index is desirably selected such that the principal components of the modulated signal will be at two different frequencies. The system includes detectors for detecting variations in the difference between like parameter of the first and second frequencies to produce an output. This parameter may be amplitude or frequency. Thus the amplitude differential frequency differential between the generated signals of different frequency may be detected and the ouptut signal processed for indicating the presence of an object in the field.

The invention itself, both as to its organization and method of operation, as well as additional objects and advantages thereof will become more readily apparent from a reading of the following description in connection with the accompanying drawings in which.

The theory of operation of the electromagnetic object detection system provided by the invention is discussed in the above referenced patent. Suffice it to say at this point that an intruding object in a sensing field having two frequencies produces cyclic variations in the frequency differential signal or beat frequency between the signals which establish the sensing field. It has also been found that similar cyclic variations are also manifested and that the amplitude differential between the signals of different frequency also varies cyclically and may be detected to indicate the presence of an intruding object. The cyclic variations occur at intervals of approximately eight feet as measured from the antenna when the frequencies of the field are at about 60 MH$_z$ and of about four feet intervals when the frequencies are at about 120 MH$_z$.

Figure 1:
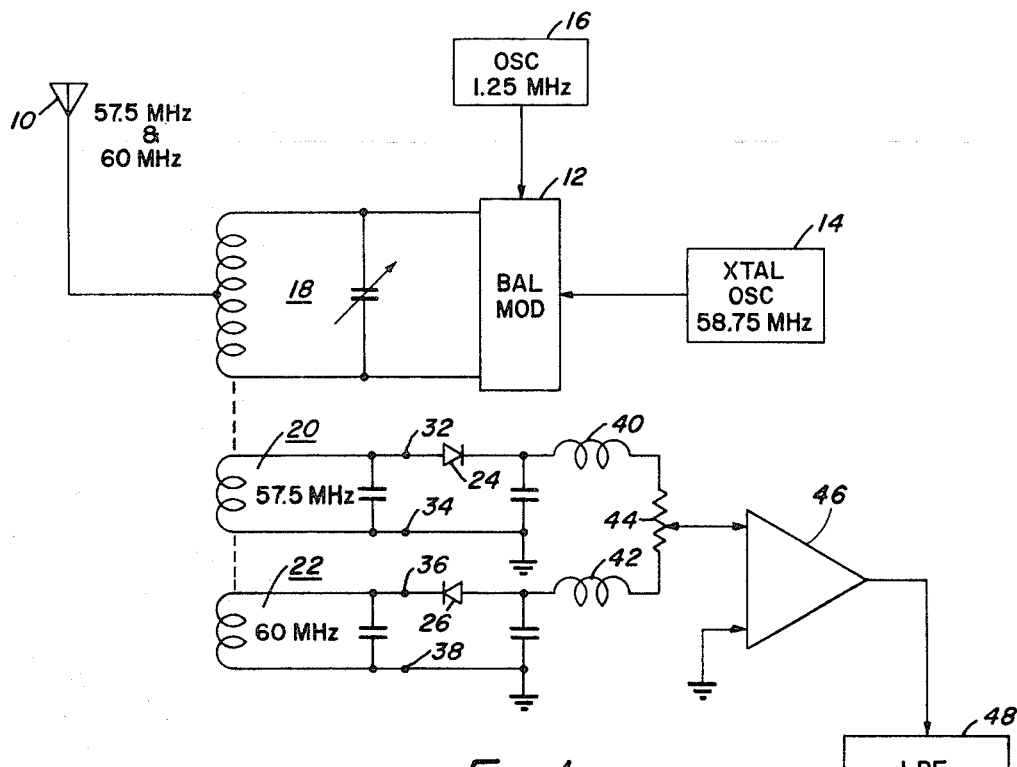
FIG. 1 is a schematic diagram of an object detection system employing amplitude modulation embodying the invention.

Referring to FIG. 1, there is shown an antenna 10 which establishes the sensing field. In this illustrative case the frequencies of the field are shown to be 57.5 MH$_z$ and 60 MH$_z$. In order to excite the antenna to establish a field having these frequencies, a balanced modulator 12 is utilized. This modulator is driven by a carrier signal of 58.75 MH$_z$ produced by a crystal oscillator 14. A modulating signal is produced by another oscillator 16 having a frequency of 1.25 MH$_z$. The output of the balanced modulator is connected to a tank circuit 18 which is tuned to approximately 58.75 MH$_z$ but has a band width of approximately 2.5 MH$_z$ such that the sidebands due to the modulation of the carrier by the modulating signals in the balanced modulator 12 (viz., 57.5 Mhz and 60 Mhz) may be coupled to the antenna which is connected to a tap on the coil (inductor) in the tank circuit 18. The balanced modulator 12 may be a ring type rectifier bridge. One end of the tank circuit is connected to a junction between the arms of the bridge and the other end of the tank circuit 18 may be connected to a tap on the coil of the frequency determining circuit in the oscillator 14. It will be observed therefore that by amplitude modulation techniques the two side band signals establish the dual frequency sensing field and the carrier frequency is suppressed.

Detection of the perturbations in the field is accomplished by two tank circuits, preferably of high Q (100 to 200), which are coupled to the coil in the tank circuit 18. One of these tank circuits 20 is tuned to 57.5 Mhz such that it responds to the 57.5 Mhz component of the sensing field. The other tank circuit 22 is tuned to 60 Mhz and responds to the 60 Mhz component of the sensing field. Detector circuits 24 and 26, including oppositely polarized diodes 28 and 30, are connected across the tank circuits 20 and 22, and envelope detect the RF signals picked up by the tank circuits. The detected signals will vary in amplitude in accordance with the variation in amplitude of 57.5 Mhz and 60 Mhz components of the field and, therefore, will exhibit the cyclic variations referred to above when an intruding object enters the field.

The detected eveloples of the 57.5 and 60 MHz signals are connected through chokes 40 and 42 across a balancing potentiometer 44. The chokes isolate the potentiometer from any RF signals which may leak through the detector circuits 24 and 26. The balanced potentiometer is used to combine the two signals of opposite polarity, thus subtracting the two signals. When an intruding object enters the field at 100 feet, the reflected signals are out of phase, but since the outputs are oppositely polarized by diodes 24 and 26, the signals add at the tap of the potentiometer 44. However, the signals will cancel when the intruder is near the antenna. The potentiometer 44 is adjusted to exact this cancellation.

This amplitude differential signal is amplified in an amplifier 46 and is passed through a low pass filter 48 which discriminates against any high frequency noise. It will be noted that the cyclic variation in the amplitude differential signal will be of relatively low frequency considering that the signal will generate one cycle for each eight feet of travel of the intruding object. If the intruding object, is a vehicle, it will generate a frequency of 13 Hz for a speed of 100 miles per hour. The filtered amplitude differential signal is integrated in an integrating circuit 50 which may be an RC integrator which is reset after a period of time, say four to eight seconds, by a timing circuit 52, in the event that an amplitude differential signl does not appear during this four to eight second interval. The output of the integrator is applied to a threshold circuit 54, such as a one shot multivibrator which produces an alarm pulse when the integrated amplitude differential signal exceeds a threshold high enough so that noise does not produce an alarm indication. The threshold circuit 54 pulse activates an alarm generator 56 which may be a circuit for producing either an alarm pulse or a relay circuit for pulling in a circuit which activates a visual or aural alarm or for otherwise actuating automatic devices when an intruding object enters the sensing field.

Figure 2A:
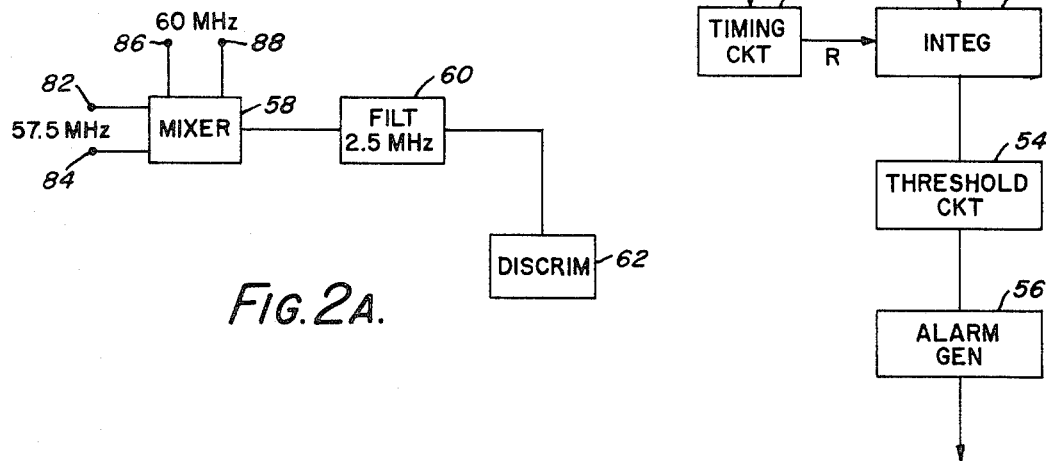
FIG. 2A is a block diagram of the detector portion of the system shown in FIG. 2.
Figure 2:
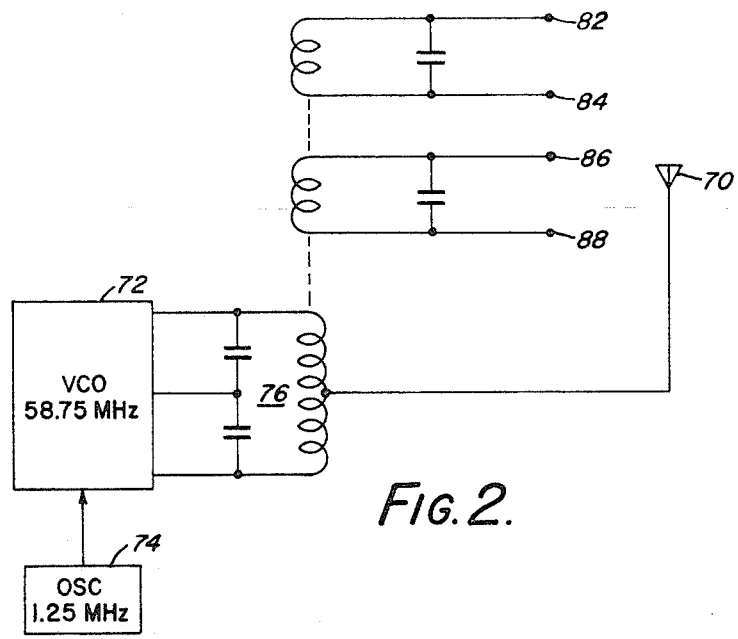
FIG. 2 is a simplified block diagram of a system provided in accordance with another embodiment of the invention utilizing frequency modulation for the establishment of a sensing field.

FIG. 2 illustrates an intrusion detection system wherein the sensing field having the two frequencies is generated by frequency modulation. This system requires even fewer parts than the system shown in FIG. 1. An antenna 70 is excited by a frequency modulated oscillator which is illustrated as a variable frequency oscillator 72 of the voltage controlled (VCO) type. ThS oscillator itself may be a Colpitts oscillator having a variable capacity diode, known as a varactor, connected across its tank circuit 76. A modulating signal is supplied from an oscillator 74, the output of which is connected across the varactor diode. An antenna matching tap on the inductor of the tank circuit 76 is connected to the antenna 70. In the illustrated system the varactor controlled oscillator has a nominal or center frequency of 58.75 Mhz which may be considered as the carrier frequency. The modulating signal from the oscilltor 74 is illustrated as having a frequency of 1.25 Mhz. In a preferred embodiment the amplitude of the modulating signal is such as to produce a deviation of 2.90625 Mhz or ± 1.853126 Mhz about the 58.75 Mhz carrier. This affords a modulation index of 2.405. At this modulation index, the carrier component of the output signal from the oscillator 72 is almost of zero amplitude and the first order side bands are of the most significant (55 percent of full amplitude). These side bands are at 60 Mhz and 57.5 Mhz.

The detection of the amplitude or frequency differential signals is provided by a first tank circuit 78 which may be tuned to 57.5 Mhz and a second tank circuit 80 tuned to 60 Mhz. These tank circuits have output terminals 82 and 84 for the tank circuit 78, and 86 and 88 for the tank circuit 80. These output terminals, similarly with the tank circuit terminals 32, 34, 36 and 38 in FIG. 1, are connected to amplitude detectors (viz., evelope detectors). In the case of amplitude detection circuits, the direct current output from the radio frequency monitoring circuits provided by the tanks 78 and 80 is again subtracted to provide an output signal which is processed by a system of circuits 46 to 56 (FIG. 1) to produce the alarm output.

FIG. 2A illustrates a system for detecting the frequency differential signal. This sytem includes a mixer 58 having inputs connected to the terminals 82 and 84 of the tank circuit 78 and the terminals 86 and 88 of the tank circuit 80. Amplifiers may be connected between these terminals and the inputs to the mixer if necessary to provide sufficiently high levels to drive the mixer. The output of the mixer is filtered in a band pass filter 60, having its band pass centered at 2.5 Mhz about 100 Khz to extract the 2.5 Mhz side band resulting from the mixing process. This 2.5 Mhz mixer sideband represents the frequency differential signal. A shift in the frequency of this signal of 2.5 Mhz is detected by a frequency discriminator circuit 62. The output of the frequency discriminator may be connected to the circuits which provide the alarm output, such as the amplifier 46, filter 48, timing circuit 52 and integrator 52, threshold circuit 54 and alarm generator 56, as explained in connection with FIG. 1.

Figure 3:
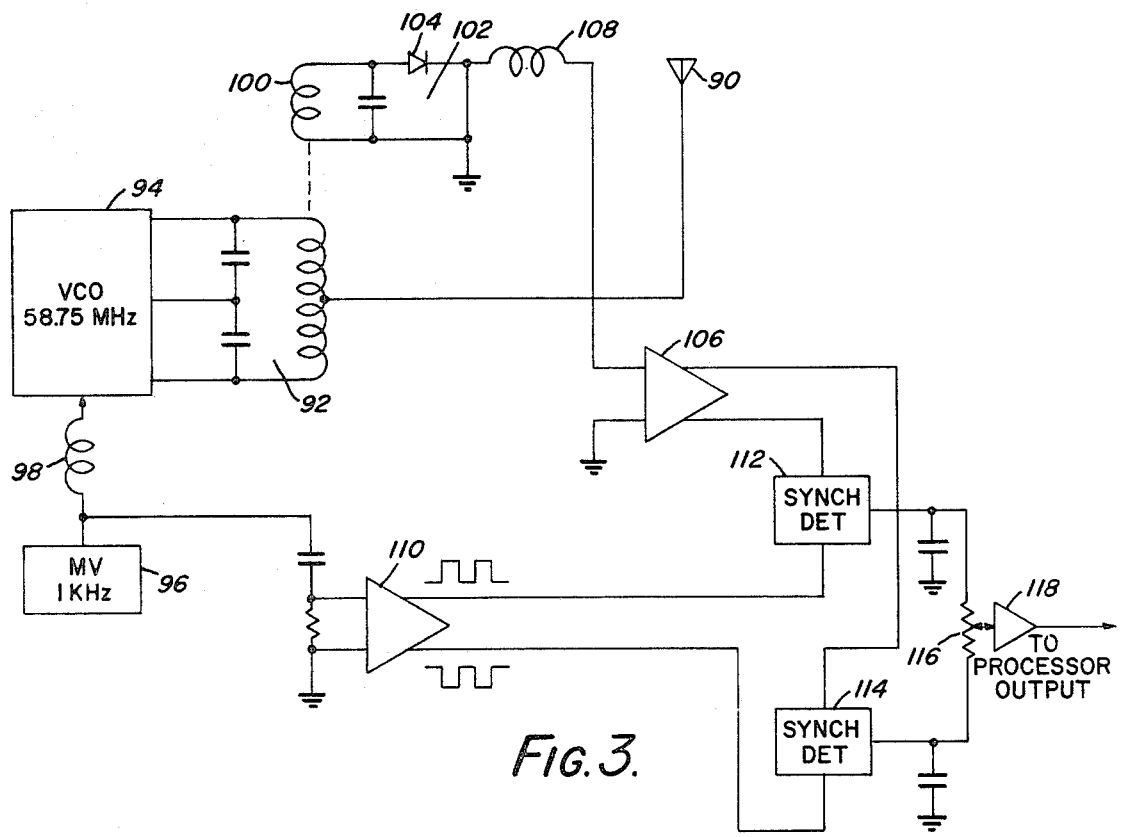
FIG. 3 is a block diagram of a system in accordance with still another embodiment of the invention utilizing frequency modulation and synchronous detection for providing an output signal in response to the presence of an object.

In FIG. 3, an antenna 90 is driven from a voltage controlled oscillator tank circuit 92 which is part of a varactor controlled oscillator 94; the varactor controlled oscillator 94 and its tank circuit 92 being similar to the oscillator 72 and tank circuit 92 shown in FIG. 2. The modulating signal is, however, produced by a free running multivibrator 96 or other square wave generator which is illustrated herein as producing 1 Khz pulse train. The multivibrator 96 is connected to the varactor in the varactor controlled oscillator 94 by a choke 98 which isolates the multivibrator 96 from any RF signals which are generated in the varactor controlled oscillator 94. The square wave modulating signal may be of lower frequency, but the frequency thereof should be lower than the highest expected frequency of the detected signals resulting from the presence of an intruding object. In most instances, for a 60

Mhz exciting field, the frequency of the modulating signal should be above 10 hz. Preferably, the deviation of the frequency of the varactor controlled oscillator should be 2.5 Mhz (± 1.25 Mhz). The exciting field will then have its principal component at 57.5 and 60 Mhz as heretofore mentioned in connection with the other embodiments of the invention.

For the detection of the alarm signal a tank circuit 100 tuned to 58.75 Mhz, but having a band width of 2.5 Mhz (57.5 to 60 Mhz), it utilized. Accordingly, both the 57.5 and 60 Mhz components of the exciting field will be monitored. A detector circuit 102 including a diode 104 is connected across the tank circuit 100 and the direct current output therefrom is applied to a paraphase amplifier 106 via a radio frequency isolating choke 108. It will be noted that the amplitude detection circuit consisting of the tank 100 and the detector 102 is similar to either of the circuits 20, 24, or 22, 26 shown in FIG. 1. The paraphase amplifier 106 has two outputs which produce signals in 180° out of phase relationship. A demodulating signal having a square wave configuration is obtained from a paraphase limiting amplifier 110 which is connected to the multivibrator 96. These square wave signals, which are of opposite phase, are applied to the inputs of different synchronous detectors 112 and 114. The synchronous detectors may be diode bridges, to the opposite corners of which, the bi-phase outputs of the amplifier 106 and 110 are applied. The multivibrator pulses of one polarity will correspond to the 57.5 Mhz component of the exciting field while the multivibrator pulses of opposite polarity (the alternate half cycles of the multivibrator pulse train) correspond to the 60 Mhz components. This relationship results from the frequency deviation produced by the opposite polarities of the square waves which are applied to the varactor diode in the varactor controlled oscillator 94. Accordingly, the synchronous detectors 112 and 114 produce dual outputs, one corresponding to the 57.5 Mhz component and the other to the 60 Mhz component.

By applying the bi-phase signals to oppositely polarized diodes in the synchronous detectors the envelope of the 57.5 Mhz components and of the 60 Mhz components can be separately detected, the amplitude differential signal is obtained at the tap of a potentiometer 116 and applied via an amplifier 118 to a system of processing circuits similar to the circuits 45–56 shown in FIG. 1.

From the foregoing description it will be apparent that improved object detection systems have been provided. Variations and modifications in the herein described system, with the scope of the invention, will undoubtedly become apparent to those skilled in the art. Thus, the foregoing description should be taken as illustrative and not in any limiting sense.

What is claimed is:

1. An intrusion detection system which comprises
   a. an antenna for establishing a sensing field,
   b. means for generating a carrier signal,
   c. means for generating a modulating signal,
   d. means for modulating said carrier signal with said modulating signal to produce signals having first and second different frequencies,
   e. a tank circuit including an inductor and a capacitor connected between said modulating means and said antenna for applying said signals having said first and second frequencies to said antenna,
   f. first and second inductors coupled to said tank circuit inductor,
   g. first circuit means including said first inductor tuned to said first frequency,
   h. second circuit means including said second inductor tuned to said second frequency,
   i. detector circuit means connected to said first and second circuit means for detecting variations in the difference between a like parameter of said signals having said first and second different frequencies to which said first and second circuit means are tuned to produce an output signal corresponding to said difference, and
   j. means responsive to said output signal for indicating the presence of an output in said field.

2. The invention as set forth in claim 1 wherein said detector circuit means each includes first and second amplitude modulation detectors connected to said first and second circuit means and means responsive to the difference between the outputs of said first and second amplitude modulation detectors for producing said output signal.

3. The invention as set forth in claim 1 wherein said detector circuit means includes a mixer connected to said first circuit means and to said second circuit means for deriving said first and second frequencies, and a frequency discriminator responsive to variations in frequency of said difference frequency signal for producing said output signal.

4. An intrusion detection system which comprises
   a. an antenna for establishing sensing field,
   b. a variable frequency oscillator producing a carrier signal,
   c. a square wave generator producing a modulating signal,
   d. means for applying said modulating signal to said variable frequency oscillator to produce a modulated signal having first and second frequencies as principal components at alternate successive intervals of time corresponding to alternate half cycles of said modulating signal,
   e. means for applying said signals having said first and second different frequencies to said antenna for exciting said antenna to produce said sensing field,
   f. means for detecting variations in the difference between a like parameter of said first and second frequencies to produce an output signal, and
   g. means responsive to said output signal for indicating the presence of an object in said field.

5. The invention as set forth in claim 4 wherein said detecting means includes synchronous detectors responsive to said modulated signal and to said modulating signal for producing said output signal.

6. The invention as set forth in claim 5 wherein said detecting means coupled to said means for applying said signal to said antenna for deriving said modulated signal as varied by objects in said sensing field includes first and second synchronous detectors, means for applying said modulating signal and said modulated signals to different ones of said synchronous detectors in opposite phase relationship, and means responsive to the sum of the outputs of said synchronous detectors for providing said output signal.

* * * * *